United States Patent [19]

F'Geppert

[11] Patent Number: 4,486,479
[45] Date of Patent: Dec. 4, 1984

[54] HOLLOW THREE DIMENSIONAL AIR-INFLATABLE STRUCTURES

[75] Inventor: Erwin F'Geppert, Oakland County, Mich.

[73] Assignee: The United States of America as represented by the Secretary of the Army, Washington, D.C.

[21] Appl. No.: 549,095

[22] Filed: Nov. 7, 1983

[51] Int. Cl.³ .............................................. B32B 3/20
[52] U.S. Cl. ...................................... 428/35; 428/12; 428/72; 428/166; 428/178
[58] Field of Search .................... 428/12, 35, 72, 166, 428/178, 188, 309, 919; 244/31, 128, 98, 160, 126; 46/12, 17, 30, 87–90; 52/2, 4, 5; 114/345; 89/1, 1 R, 1 A

[56] References Cited

U.S. PATENT DOCUMENTS 4,346,132 8/1982 Cheng .................................. 428/76

Primary Examiner—George F. Lesmes
Assistant Examiner—Pamela R. Schwartz
Attorney, Agent, or Firm—Peter A. Taucher; John E. McRae; Robert P. Gibson

[57] ABSTRACT

An air-inflatable structure wherein each flat wall of the structure comprises a separate air bag. Sharp rectangular corners can be formed at the demarcation zones between the separate air bags. The invention is particularly useful in the formation of air-inflated structures having flat walls and sharp corners, e.g., decoy (fake) military vehicles. Decoy structures (e.g., tanks, trucks, etc.) can be made to achieve closer more realistic simulations of actual structures.

5 Claims, 13 Drawing Figures

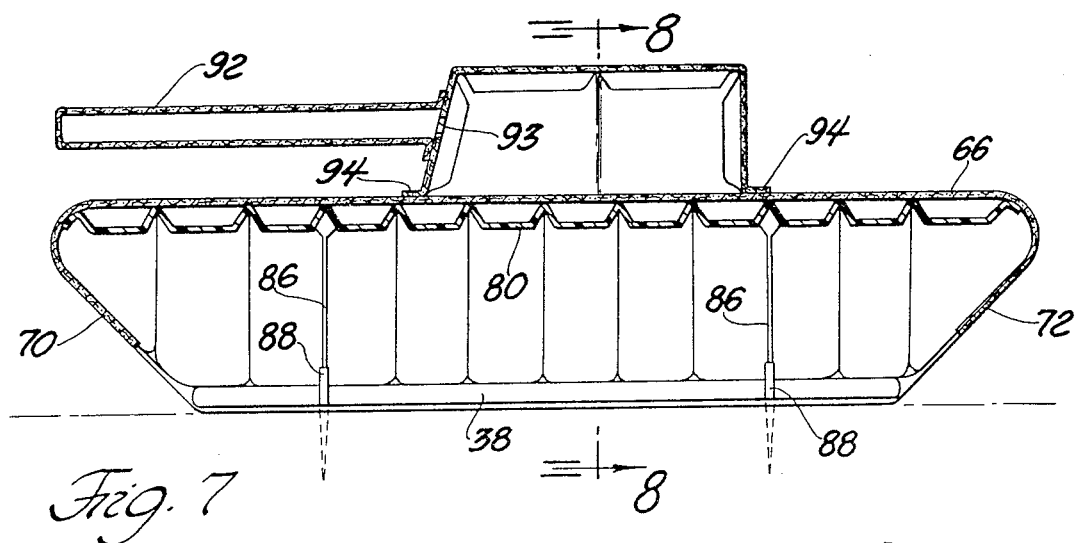
Fig. 7
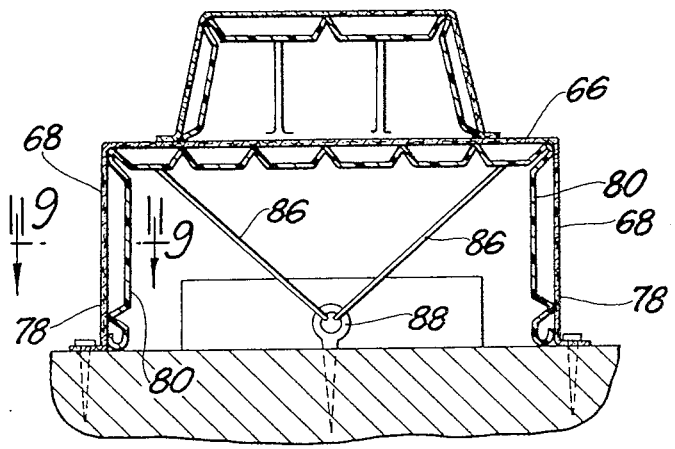
Fig. 8
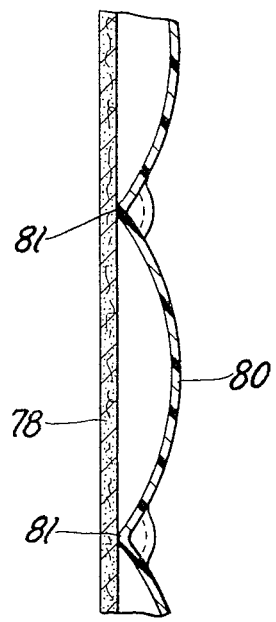
Fig. 9
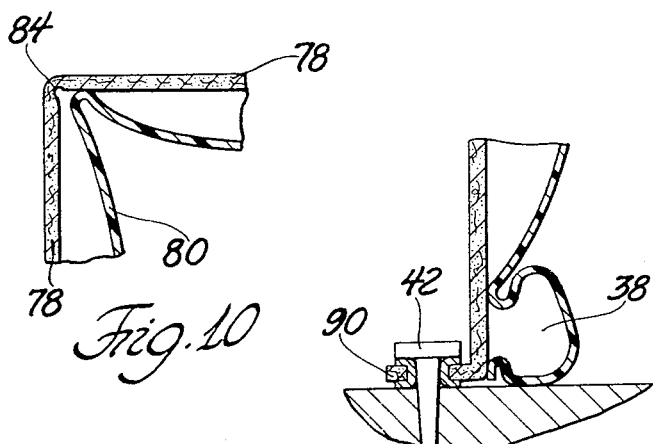
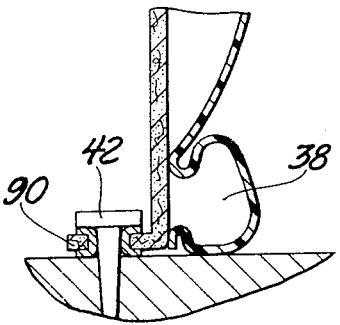
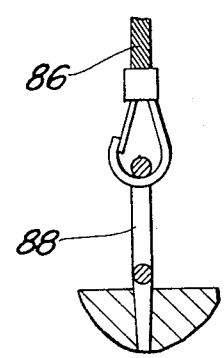
Fig. 10  Fig. 11  Fig. 12

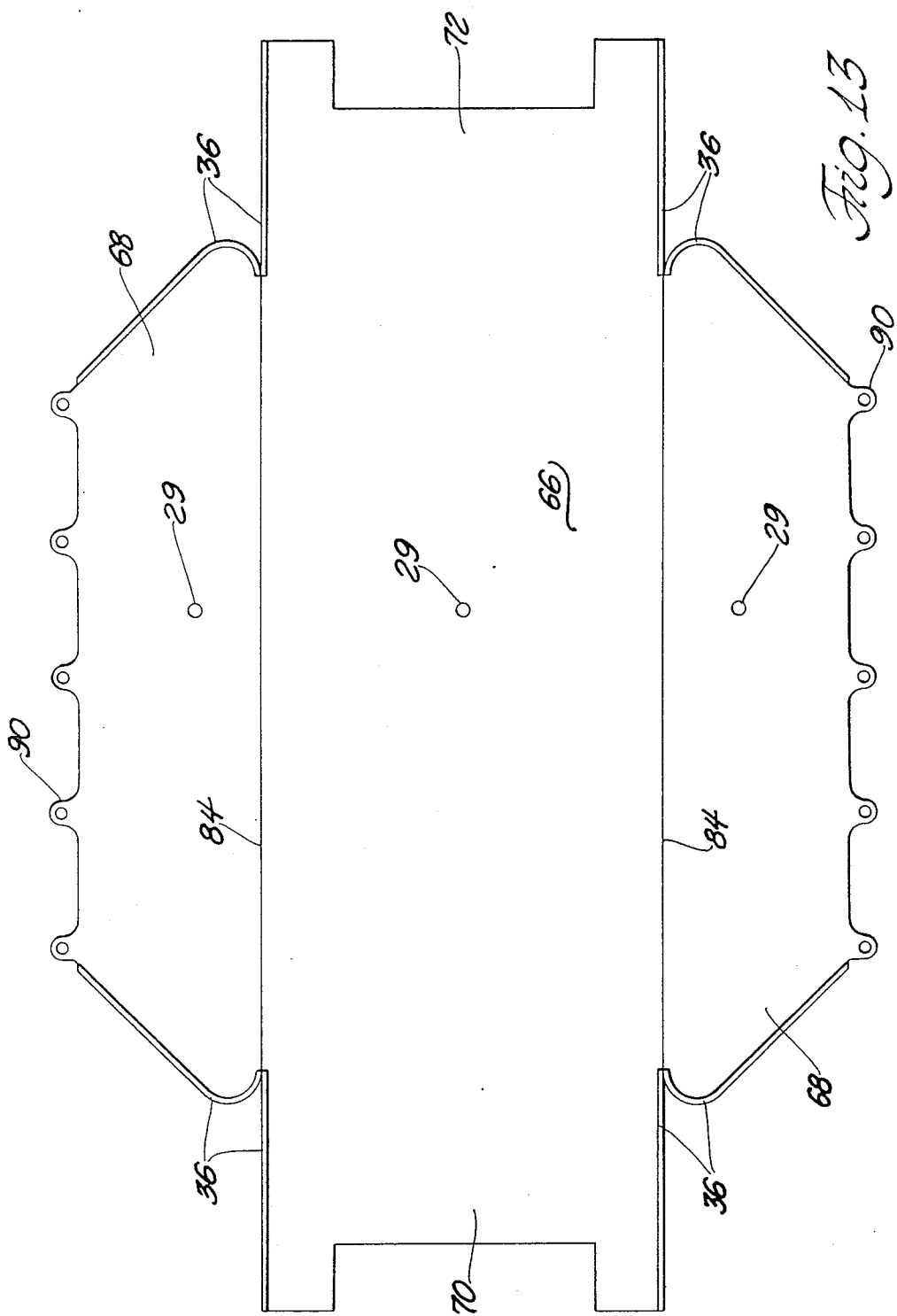

HOLLOW THREE DIMENSIONAL AIR-INFLATABLE STRUCTURES

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to air-inflatable structures formed of flexible panels or sheets, e.g., rubber, non-porous fabric, or plastic. Structures of principal interest are simulated military structures useful as decoys, e.g., simulated vehicles or buildings. Such decoys are deployable during wartime to give the enemey false information as to actual vehicle quantities and actual vehicle locations, the aim being to draw enemy fire so that less ammunition is available to deal with actual fighting machines or structures. Among the military structures to be simulated are trucks, tanks, barracks and similar small buildings, tents, trailers, and cargo containers.

Many of the military structures of principal interest have flat sides and sharp corners. It is difficult to simulate such shapes when using conventional air-inflated systems; internal air pressures tend to round out the corners and flat sides so that the pressurized structures do not fully simulate the actual structures. I believe that if the air-inflatable structures are designed to include a series of separate air bags, one for each flat wall, it should be possible to achieve a more realistic simulation of the actual structure. Under my concept sharp corners are formed at the separation lines between different ones of the air bags, such that the bags do not extend across the corner areas.

Principal objects of the invention are to provide a three dimension air-inflatable structure wherein:

1. at least some of the structure walls have flat outer surfaces,
2. the corners between adjacent walls are sharp, as opposed to being rounded or bulged out,
3. only relatively small quantities of pressurized air are required to inflate the structure to its three dimensional configuration, and
4. the structure occupies a relatively small storage space in its deflated condition.

THE DRAWINGS

FIG. 7 is a view similar to FIg. 1, but illustrating another form that the invention can take.

FIG. 8 is a sectional view taken on line 8—8 in FIG. 7.

FIG. 9 is a sectional view taken on line 9—9 in FIG. 8; FIG. 9 is taken on an enlarged scale.

FIG. 10 illustrates an upper corner area of the FIG. 7 structure.

FIG. 11 illustrates a lower corner area of the FIG. 7 structure.

FIG. 12 fragmentarily shows a cord structure usable in the FIG. 8 embodiment.

FIG. 13 shows a part of the FIG. 7 structure in a collapsed depressurized condition.

Figure 1:
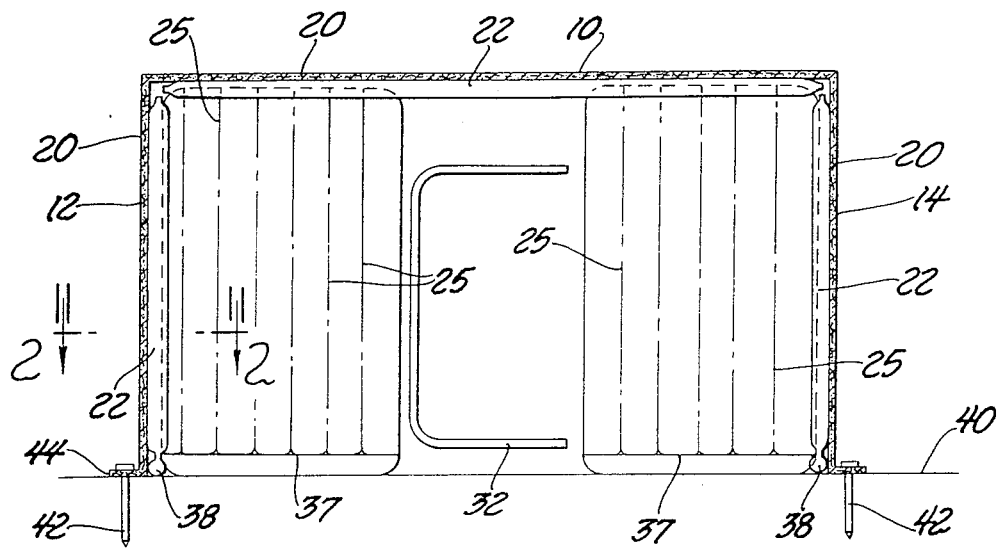
FIG. 1 is a sectional view taken through a hollow cubic tent structure embodying the invention. The structure is shown in its inflated pressurized state.
Figure 2:
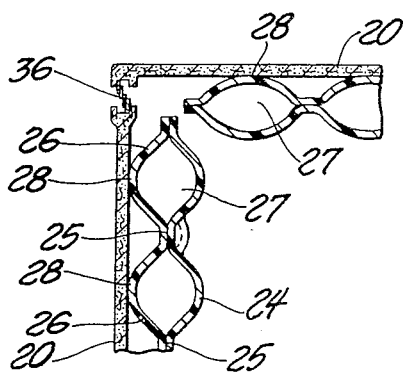
FIG. 2 is a fragmentary sectional view on line 2—2 in FIG. 1.
Figure 3:
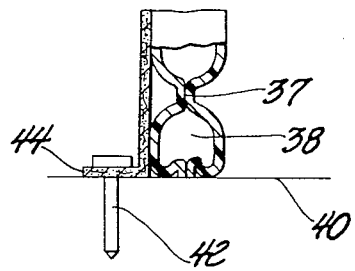
FIG. 3 is an enlarged fragmentary view of a lower corner area of the FIG. 1 structure.
Figure 4:
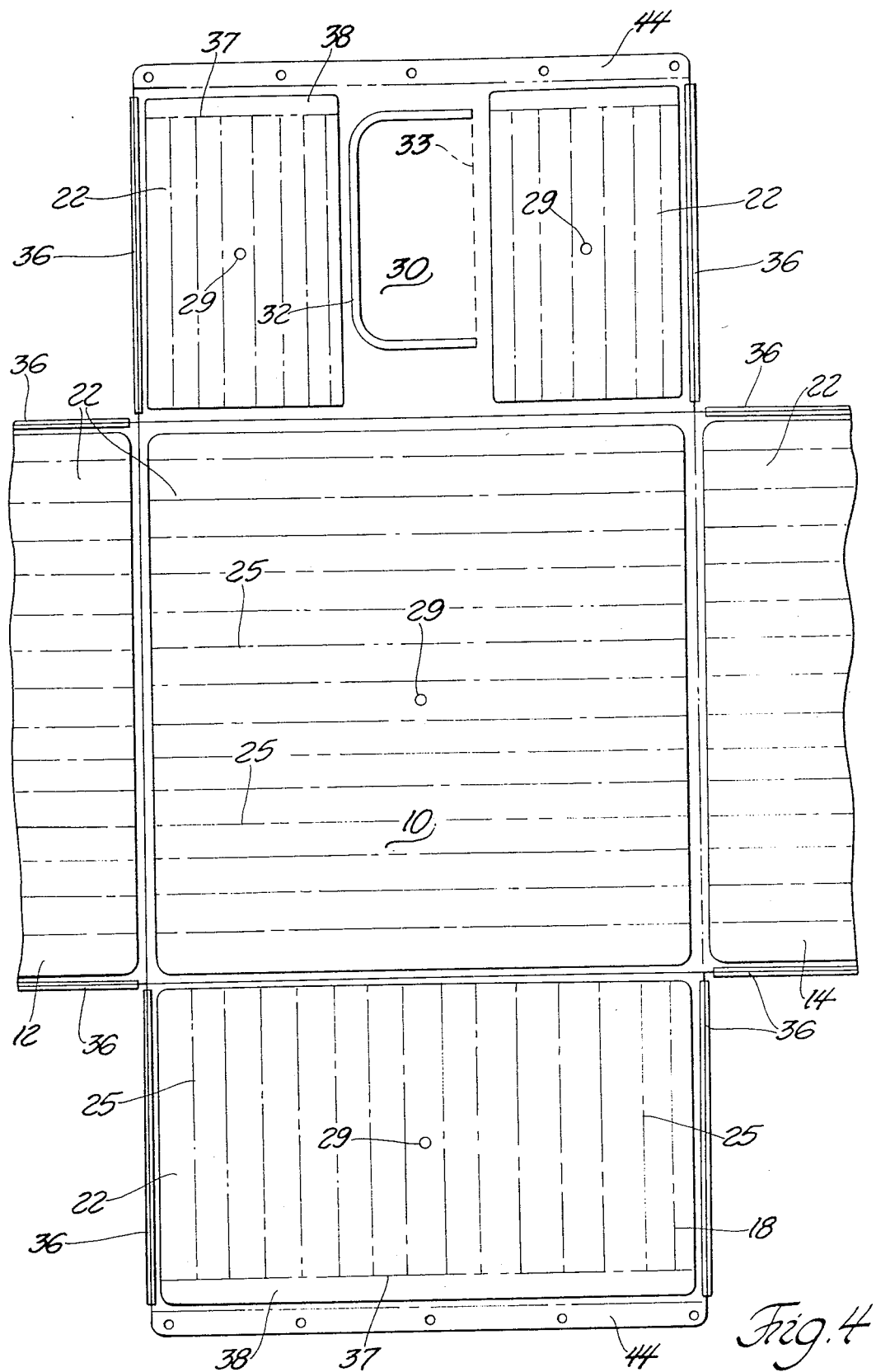
FIG. 4 is a view of the FIG. 1 structure in a collapsed condition.

Referring more particularly to FIGS. 1 through 4, there is shown a hollow three dimensional structure comprised of a flat roof wall 10, and four flat side walls 12, 14, 16 and 18. FIG. 1 shows the structure in its erected inflated configuration, whereas FIG. 4 shows the structure in its collapsed state, with the structure side walls in partially detached conditions. The illustrated structure may be used as a tent although it could be used as a simulated shed or small building; i.e., a decoy structure usable by the military to lead the enemy force into believing the structure is an actual building or shed. FIG. 1 is intended primarily to indicate the general principle of the invention, not any particular configuration or usage.

Each of walls 10, 12, 14, 16 and 18 comprises an outer flexible sheet 20 and at least one separately-formed air bag 22; the air bags, when pressurized, serve to rigidify the associated walls and resulting three dimensional structure. Each air bag is generally coextensive with the face area of the respective outer sheet so that each air bag imparts significant rigidity to the associated sheet 20 when the air bag is pressurized. As best seen in FIGS. 2 and 3, a representative one of the air bags is formed of two flexible panels 24 and 26. These panels have preselected face areas 25 thereof adhered together, by stitching or bonding procedures, so that when pressurized air is intrduced into spaces 27 between the panels said panels are ballooned outwardly to form two sinuous wall segments, as shown in FIG. 2. Peak points or zones 28 on the sinuous panels are permanently bonded or adhered to the inner face of panel 20.

Sheet 20 and panels 24 and 26 may be formed of various flexible materials, such as rubber, plastic or fabric. Panels 24 and 26 are required to be of non-porous character in order to retain the inflation air in a pressurized condition. The various sheets and panels should be flexible but not necessarily elastic. Adhered areas 25 of the panels preferably are straight narrow zones extending parallel to one another along one dimension of the associated wall, as indicated generally in FIGS. 1 and 4.

Preferably panels 24 and 26 are initially pressed or embossed so that each panel has sinuous undulations when in its free state (prior to the stitching or bonding at 25). Therefore, when spaces 27 are pressurized the panel materials are not required to stretch to assume the sinuous three-dimensional configuration. Differences in elasticity of the material from one place on each panel to another place will have minimal effect on the panel configuration (when pressurized). The aim is to obtain a pressurized air bag wherein the various peak zones (lines) 28 are planar aligned, i.e., in one single plane. With such an arrangement there is an increased assurance that outer sheet 20 will have a flat orientation, free of wrinkles or undulations.

As regards side walls 12, 14, 16 and 18, adhered areas 25 extend vertically to provide vertical reinforcement for the associated walls. The perimetrical edges of panels 24 and 26 are adhered together to seal against loss of pressurization air out of the chambers 27 defined by adhered areas 25. Pressurized air is initially introduced to each individual air bag through a conventional tire valve located at any conventional point on panel 24. FIG. 4 shows valves 29 on central areas of the air bags. Adhered areas 25 terminate short of the sealed panel edges to provide small cross channels for air flow from one chamber to another within any given air bag.

As best seen in FIG. 4, the overall system comprises six air bags. Each of walls 10, 12, 14 and 18 has one air bag thereon. Wall 16 has two air bags 22 arranged to provide a central area for a flap-like door or closure 30 defined by a conventional zipper structure 32. With the zipper elements separated closure 30 can be pulled back around imaginary hinge axis 33 to gain access to the tent interior space.

FIG. 4 shows the structure in a collapsed condition, with side walls 12, 14, 16 and 18 radiating outwardly from roof wall 10. Adjacent side edges of walls 12, 14, 16 and 18 may be equipped with conventional zipper mechanisms 36, such that when adjacent ones of the wall edges are brought together the slide element on a given one of the zippers may be moved along the confronting zipper teeth to interlock said teeth and thus connect the tent side walls together. With the four zipper mechanisms in their locked conditions the assembly assumes a hollow cubical configuration. Preferably the air bags are pressurized before actuation of the zipper mechanisms.

The pressurized sinuous panels 24 and 26, shown in FIG. 2, rigidify the side walls and thus provide resistance to deformation or collapse of the cubical structure under wind or other environmental conditions. The various adhered zones 25 will be spaced sufficiently close together to provide the desired degree of rigidity, depending on expected conditions.

The weight of the cubical structure may be supported by horizontal air cushion chambers at the lower edges of the structure side walls. As best seen in FIG. 3, areas 37 of panels 24 and 26 are adhered together to form a horizontal chamber 38 at the lower edge of each air bag. When chamber 38 is pressurized with air flowing through the associated valve 29) the chamber forms a relatively large pressurized lower face suited to bear on terrain 40 for supporting the cubical wall structure. The cubical wall structure may be retained against inadvertant lift-off or dislodgement by means of stakes 42 driven through openings in flaps 44 that extend from the lower edges of walls 12, 14, 16 and 18.

When zipper mechanisms 36 are separated and valves 29 actuated to depressurize the various air bags, the walls of the cubical structure will assume a flat uniplanar configuration of minimum wall thickness. The walls can be folded onto one another, and then rolled up into a relatively small size package for storage and/or transport purposes.

Figure 5:
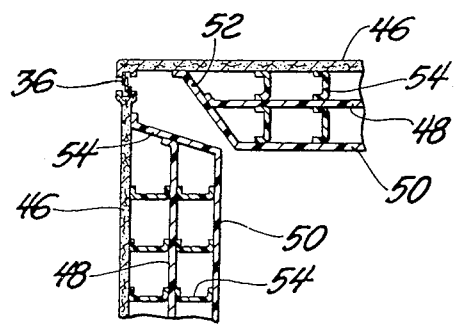
FIG. 5 is a fragmentary view taken in the same direction as FIG. 2 but illustrating a second wall cross section usable under the invention.
Figure 6:
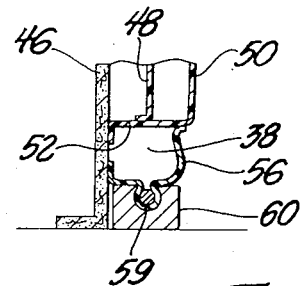
FIG. 6 is a fragmentary view of a lower corner area of the structure represented by FIG. 5.

FIGS. 5 and 6 correspond generally to FIGS. 2 and 3, except that FIGS. 5 and 6 illustrate a variant in wall structure design. The design of FIGS. 5 can be used for the side walls and for the roof wall. Each wall may be formed to include an outer flexible panel 46, an intermediate flexible panel 48, and an inner flexible panel 50. The peripheral edge area 52 of panel 50 is extended to panel 46, to thereby form two compartments between panels 46 and 50. Each compartment is subdivided into a series of elongated chambers by means of transverse flexible partitions 54.

Partitions 54 correspond generally to the connected sinuous walls of FIG. 2 in the sense that such partitions serve as rigidifyig mechanisms for the inflated wall structure. Partitions 54 prevent panels 46 and 50 from ballooning outwardly away from panel 48. Preferably the intermediate panel 48 and partitions 54 are provided with small openings for enabling pressurized air to flow from one chamber to another chamber. A single tire valve (not shown) may be used to pressurize all air chambers in any given air bag.

FIG. 6 shows an alternate to the support cushion of FIG. 3. In FIG. 6 an auxiliary flap 56 is extended from panel 50 to panel 46 to form an elongated pressurizable chamber 38 running along the lower edge of the wall structure. A cord 59 may be carried by flap 56 for reception in a groove extending along the upper face of a metal bar 60. Bar 60 acts as a load transfer device between pressurized chamber 38 and the terrain.

FIGS. 7 through 13 show various features of a hollow three dimensional structure usable to simulate a military tank. The turret portion 62 of the simulated tank is formed separately from hull portion 64. Flexible panels (rubber plastic or fabric) are used in generally the same fashion as described in connection with FIGS. 1 through 6.

Hull portion 64 includes a hull roof wall 66, two hull sides walls 68, a hull front wall 70, and a hull rear wall 72. FIG. 13 shows the various hull walls in the collapsed uniplanar state. Each of walls 66 and 68 is formed to include an air bag for stiffening the walls in the desired fashion. Walls 70 and 72 may, or may not, include air bags, depending on the degree of rigidity required. Walls 70 and 72 may be connected to the adjacent side walls 68 by means of zipper type fasteners 36 in the manner previously described in connection with FIGS. 1 through 4.

The structure of FIGS. 7 through 13 differs from the FIG. 1 structure in the fact that the outer panel of each wall forms an integral part of the air bag; in the FIG. 1 arrangement the outer panel (or sheet) 20 is formed separately from the air bag. As seen in FIGS. 8 and 9, each air bag comprises an outer panel 78 and an inner panel 80. Spaced areas 81 of panel 80 are adhered to panel 78 so that when the area between the panels is pressurized through a valve 29 (FIG. 13) the inner panel will balloon outwardly from panel 78 as shown in FIG. 9.

It is desired that panel 78 remain flat when the air bag is pressurized. Therefore panel 80 has the undulations preformed therein, whereas panel 78 is formed as a flat panel. Also, panel 78 is preferably made to be less flexible (more rigid) than panel 80. This could be accomplished by making panel 78 from a thicker sheet of material and/or making panel 78 from a different material, and/or artificially reinforcing panel 78 by impregnating it with varnish or a similar stiffener material. If panel 78 is formed from a relatively thick sheet it may be necessary to score the sheet at juncture 84 between the side walls and the roof wall. FIG. 10 illustrates the scores line as an indentation or slit in the inner surface of the panel.

The hull portion of the simulated tank may be anchored against lateral dislodgement or sway by means of guy wires or cords 86. Each cord may be trained between a stake 88 and small loops secured to roof 66 near the roof lateral edges. FIG. 12 shows a hook structure that can be employed at each end of the cord to facilitate connection of the cord to the associated stake or loop. FIG. 11 shows one method for defining horizontally elongated pressurized support chambers 38 at the lower edges of hull side walls 68. The hull may be held down by means of stakes 42 trained through openings in tabs 90 at the lower edges of the hull side walls.

The turret portion of the tank can be formed from a second sheet of material having sinuous sheets secured to its inner surface in generally the same fashion as described in connection with sheets 78 and 80 of FIGS. 8 and 9. Zipper mechanisms (not shown) can be utilized at selected corner areas of the simulated turret to facilitate the process of forming the depressurized structure into a relatively flat storage package. A simulated gun barrel may be formed on the turret by attaching to the turret front wall a hollow cylindrical tube 92 of flexible material. A small hole 93 in the turret front wall can be used to supply pressurized air from the front wall air bag to the tube 92 interior space.

The turret portion of the tank can be attached to the roof portion of the hull by any convenient mechanism. One possible mechanism would be eight or more snap fasteners (male and female) on the hull roof and tab areas 94 of the turret.

The drawings show two configurations that the invention can take, i.e., a shed or tent (FIG. 1) and a military tank (FIG. 7). Other configurations are possible. Structures embodying the invention have not yet been built. However, it is believed that the designs and configurations shown in the drawings are feasible and attainable. The invention is particularly aimed at hollow three dimensional structures having flat planar walls and sharp connecting corners.

When the invention is used to form simulated military vehicles (decoys) the outer surfaces of the inflated structures may have camouflage colorings thereon to improve the vehicle simulation effects.

I wish it to be understood that I do not desire to be limited to the exact details of construction shown and described for obvious modifications will occur to a person skilled in the art, without departing from the spirit and scope of the appended claims.

I claim:

1. A hollow three dimensional structure having flat planar outer wall surfaces and sharp connecting corners; said structure being formed entirely of flexible material; said structure having a flat roof wall and a number of flat side walls extending downwardly from edge areas of the roof wall, the juncture between the roof wall and each side wall constituting a sharp connecting corner; the roof wall and at least some of the side walls being air-inflatable from deflated conditions of minimum wall thickness to internally pressurized rigid conditions of maximum wall thickness; each of the air-inflatable walls being comprised of an outer flexible panel, an intermediate flexible panel, and an inner flexible panel; each inner panel having perimetrical edge areas (52) turned toward the inner surface of the outer panel, the perimetrical edge area of each inner panel being sealingly connected to the outer panel whereby the zone between the inner panel and outer panel constitutes a pressurizable air bag generally coextensive with the face area of the outer panel; a first series of flexible partitions (54) extending from each intermediate panel to the associated outer panel; and a second series of flexible partitions (54) extending from each inner panel to the associated intermediate panel; the outer panel in each air-inflatable wall being flat when the wall is in an inflated condition; the panels being constructed so that when the air bags are pressurized the walls are rigid and self-sustaining, whereby the three dimensional structure is resistant to deformation under adverse environmental conditions.

2. The three dimensional structure of claim 1 wherein the outer panel in each air-inflatable sidewall is substantially less flexible than the associated intermediate and inner panels so that when the defined air bag is pressurized the inner panel will tend to balloon away from the outer panel while said outer panel maintains a flattened condition.

3. The three dimensional structure of claim 1 wherein the partitions in each air-inflatable sidewall extend vertically when the three dimensional structure is in its inflated, self-sustaining configuration.

4. The three dimensional structure of claim 1 wherein the partitions in each air-inflatable sidewall extend vertically when the three dimensional structure is in its self-sustaining configuration; said partitions being sufficiently close together to preclude ballooning of the outer panel away from the intermediate panel.

5. The three dimensional structure of claim 3 and further comprising a flexible flap means (56) attached to each air bag at the lower edge area of the associated outer panel, said flap means defining a horizontal pressurizable chamber operable to present an extensive support surface area to the subjacent surface when the three dimensional structure is in its self-sustaining configuration.

* * * * *